INVENTORS
CARLTON L. CASE
GEORGE D. HARKEY
FRED P. MILLER
BY *Jerry J. Dunlap*
ATTORNEY July 12, 1960

C. L. CASE ET AL 2,944,421

GAS METER

Filed Dec. 12, 1955

INVENTORS
CARLTON L. CASE
GEORGE D. HARKEY
FRED P. MILLER
BY *Jerry J. Dunlap*
ATTORNEY

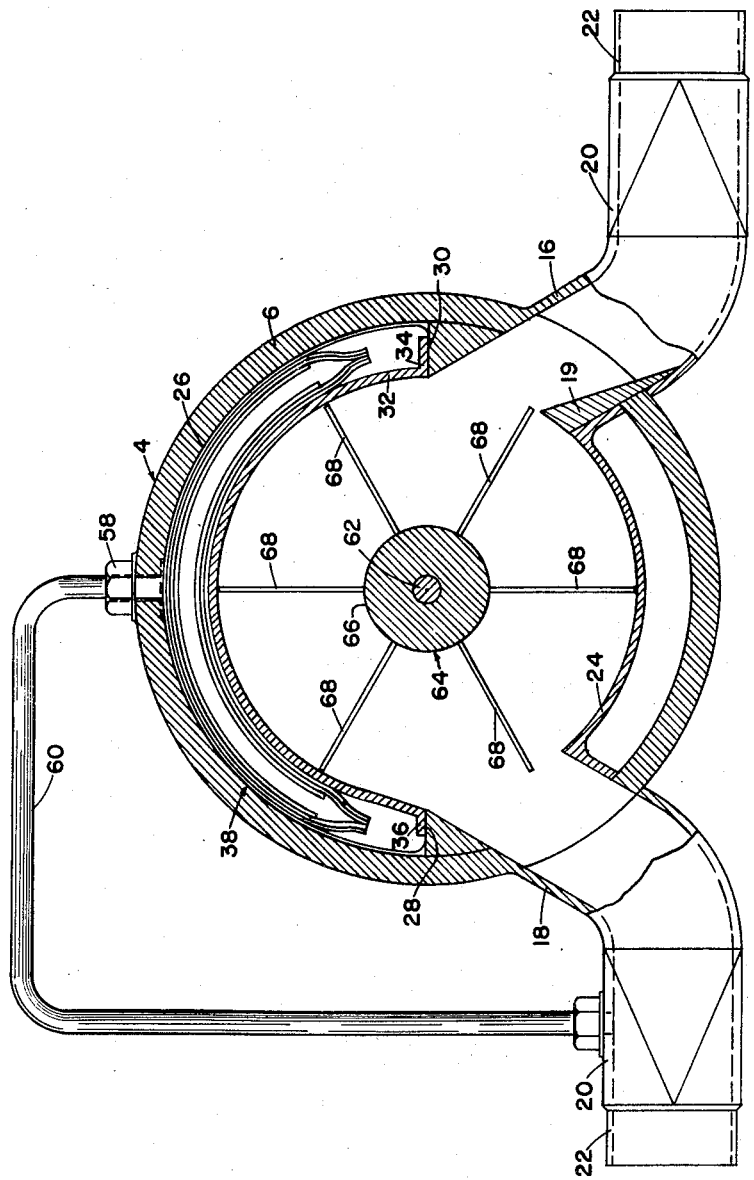

United States Patent Office 2,944,421
Patented July 12, 1960

2,944,421

GAS METER

Carlton L. Case, 38 Solimar Beach Drive, Ventura, Calif.; George D. Harkey, P.O. Box 515, Carpinteria, Calif.; and Fred P. Miller, 7811 Leo Place, Westminster, Calif.

Filed Dec. 12, 1955, Ser. No. 552,344

6 Claims. (Cl. 73—230)

This invention relates to gas measuring devices and is particularly adapted for measuring large volumes of gas, such as are encountered in the oil industry.

The best known device for measuring gas at the present time is an orifice-type meter. These meters are especially adapted for measuring relatively small volumes of gas and particularly when the gas does not contain hydrates. However, when measuring large volumes of gas, such as at the well head of a gas producing well, or the gas utilized in a gas-lift device for producing an oil well, the orifice-type meter has very definite limitations. The gas encountered in the above-mentioned applications frequently contains hydrates which will precipitate out of the gas when the gas is expanded through an orifice meter to interfere with the manometers used in the meters, and to collect on the orifice plate to interfere with the accuracy of the meters. Furthermore, the efficiency of an orifice meter is materially decreased when the flow of gas through the meter is intermittent. In addition, an orifice meter requires the use of recording charts which require frequent changing and a material addition to the duties of technicians in the field. Also, an orifice-type meter is complicated, expensive to manufacture, and requires frequent inspection for contamination of the mercury used in the manometer, plugging of the orifice fitting meter taps, and freezing due to oil and hydrate carry-over.

The present invention contemplates a novel turbine-type gas meter having a pressure operated spacer therein for controlling the size of the gas flow path through the meter, whereby a substantially constant pressure drop is maintained for all volumes of gas flowing through the meter. A gas stream directed through the meter impinges on the blades of the impeller or turbine to rotate the turbine in accordance with the volume of gas flow. The turbine is, in turn, connected to a suitable counter which may be readily adapted to provide a direct reading of the total gas flow through the meter.

An important object of this invention is to provide a gas measuring device which may be read directly to obtain the quantity of gas therethrough, and wherein the use of charts may be eliminated.

Another object of this invention is to provide a gas measuring device which will accurately measure an intermittently flowing gas stream.

A further object of this invention is to provide a gas measuring device which is substantially unaffected by hydrates contained in a gas stream flowing therethrough.

Another object of this invention is to provide an impeller-type gas measuring device, wherein the pressure drop of gas flowing therethrough will be maintained substantially constant during varying gas flow rates.

A still further object of this invention is to provide a simply constructed gas measuring device which may be economically manufactured.

Other objects and advantages of the invention will be evident from the following detailed description, when read in conjunction with the accompanying drawings, which illustrate our invention.

In the drawings:

Figure 3 is another section view as taken substantially along lines 3—3 of Figure 2.

Figure 1:
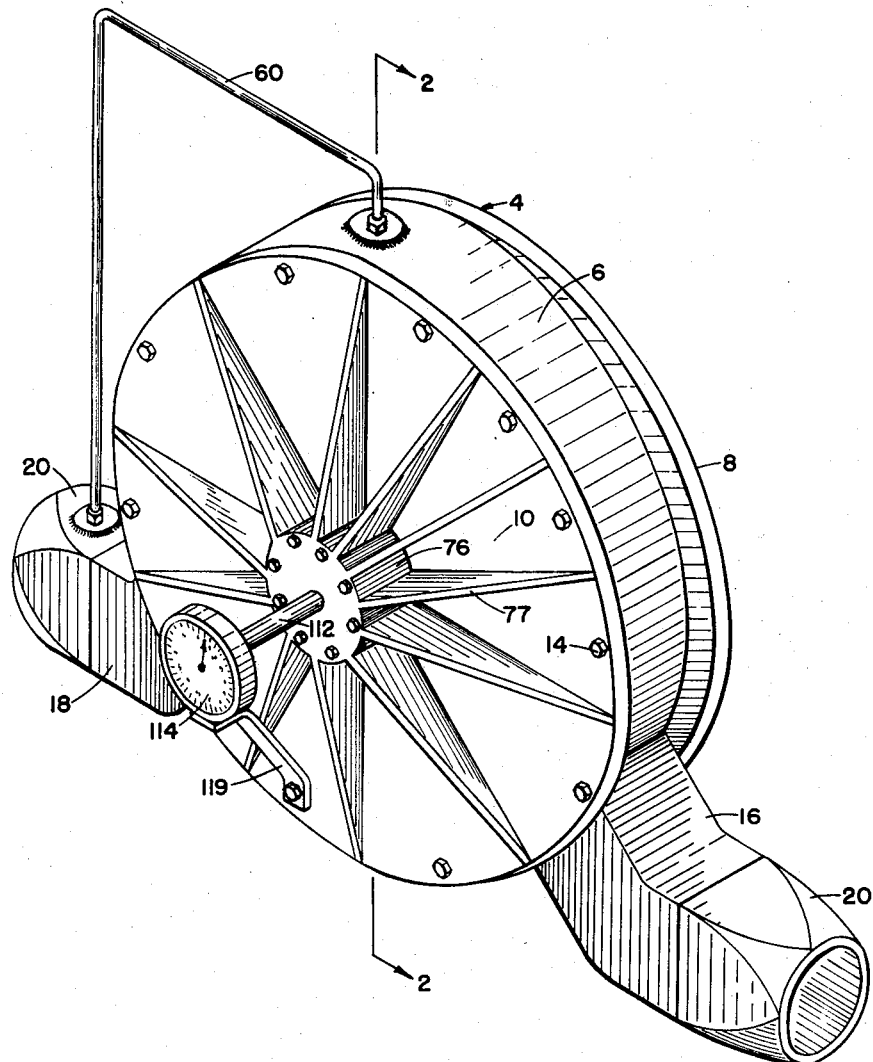
Figure 1 is a perspective view of the gas measuring device.
Figure 2:
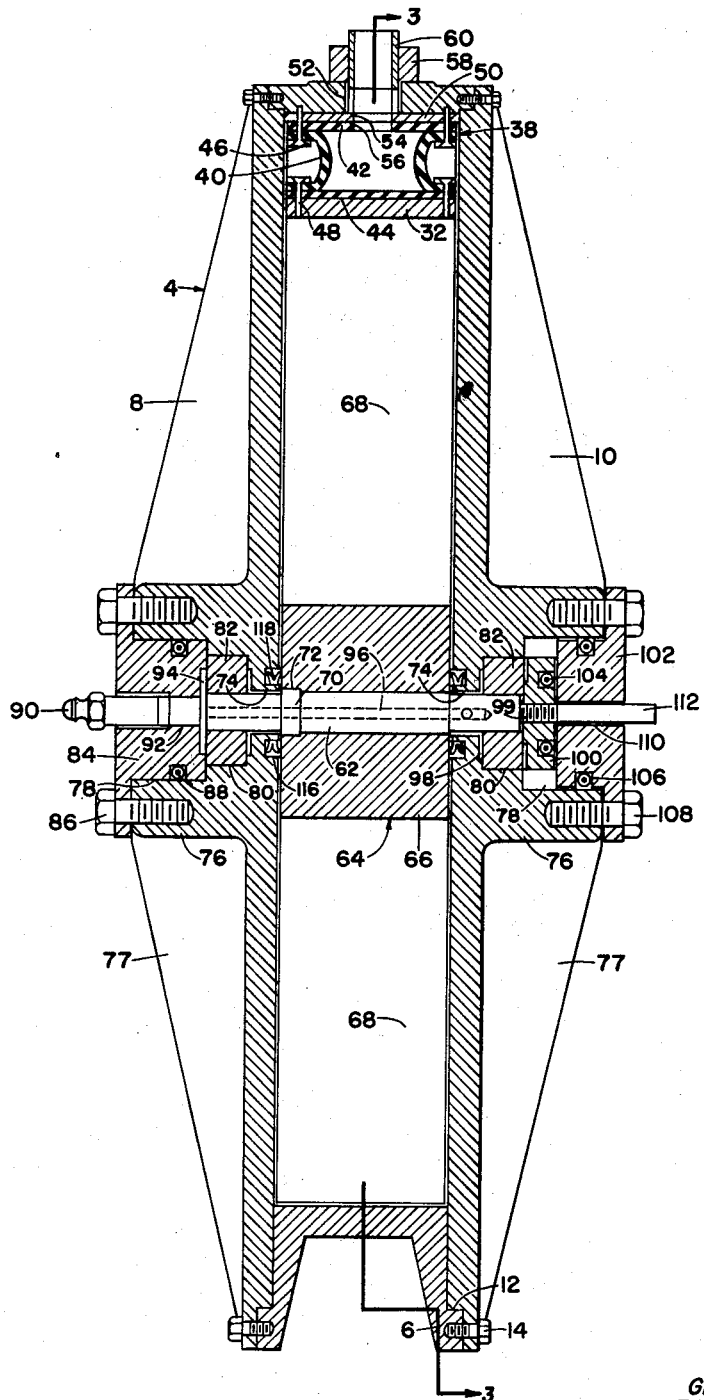
Figure 2 is a vertical transverse sectional view as taken along lines 2—2 of Figure 1.

Referring to the drawings in detail, and particularly Figure 1, reference character 4 generally designates our novel gas meter comprising a substantially circular housing 6 closed on its opposite sides by cover plates 8 and 10 (see also Figure 2). As shown in Figure 2, the outer edge of each of the cover plates 8 and 10 has an internal circumferential shoulder 12 contacting a complementary shoulder on the housing 6 to provide a centering of each of the cover plates on the housing. Each of the cover plates 8 and 10 is secured to the housing 6 by a plurality of circumferentially spaced bolts 14.

Inlet and outlet conduits 16 and 18, respectively, extend downwardly and outwardly from opposite sides of the housing 6, as shown in Figure 3. Each of the conduits 16 and 18 is preferably square in cross-section and is of a width corresponding to the width of the housing 6 to provide a smooth flow path of gas into the housing 6, as will be more fully hereinafter set forth. However, in one embodiment of this invention, we contemplate using a ramp 19 across the inner end of the inlet conduit 16 to increase the velocity of the incoming gas and direct the gas upwardly for purposes as will be hereinafter set forth. It is also preferred that the conduits 16 and 18 extend downwardly from below the center line of the housing 6 at a substantial angle, such as 60°, to provide a tangential inflow and outflow of the gas, and provide a substantially 180° flow of the gas through the housing 6. A transition section 20 connects each of the square-shaped conduits 16 and 18 to a circular-shaped connector 22, whereby the meter 4 may be conveniently interposed in a gas flow line (not shown).

The lower inner periphery 24 of the housing 6 (between the conduits 16 and 18) is raised and formed on the arc of a circle to provide a smaller radius in the lower portion of the housing than in the upper portion of the housing. The upper inner periphery 26 of the housing 6 is also formed on the arc of a circle and terminates with shoulders 28 and 30 formed immediately above the outlet 18 and inlet 16, respectively. It will be observed that the housing 6 extends inwardly at each side thereof to form the shoulders 28 and 30, and is cut at an angle to provide a continuation of the inlet 16 and outlet 18 below the respective shoulders 30 and 28. Also, it will be observed that the shoulder 30 extends inwardly in the housing 6 a greater distance than the shoulder 28.

A spacer or baffle element 32 extends around the upper inner portion of the housing 6 and has its opposite ends 34 and 36 turned outwardly for resting on the shoulders 30 and 28, respectively. The spacer 32 is substantially semi-circular in configuration, except that the portion thereof adjacent the end 36 is formed on an increasing radius to provide substantially a continuation of the top of the outlet conduit 18 when the spacer is resting on the shoulders 28 and 30. It is preferred that the spacer 32 be of a width substantially equal to the width of the housing 6, whereby the spacer will be effectively subjected to the pressure of gas flowing through the upper portion of the housing 6.

A tube-like bellows, generally designated at 38, is disposed in the upper portion of the housing 6 between the spacer 32 and the upper inner periphery 26. The bellows 38 is formed out of a pliable material, such as a rubber composition, and the sides 40 thereof (see Figure 2) may be formed separate from the top 42 and bottom portions 44. The bellows 38 may be suitably re-enforced by metal strips 46 extending over the upper and lower edges of the sides 40 throughout substantially the entire length of the bellows 38. Suitable spaced bolts 48 extend through each of the re-enforcing plates 46 and the respective side 40 and top or bottom 42 or 44 into the housing 6 and the spacer 32. Thus, the bellows 38 is secured to the housing 6 and the spacer 32. The side members 40 may be suitably sealed or vulcanized to the top 42 and bottom 44 to effectively seal the bellows 38 and prevent an escape of gas therefrom.

A substantially square plate or pad 50 is secured in a complementary recess in the upper central portion of the housing 6 immediately above the central portion of the bellows 38. An aperture 52 extends down through the housing 6 to the pad 50, and smaller apertures 54 and 56 extend through the pad 50 and bellows top 42 concentrically with respect to the aperture or bore 52. An internally threaded nut 58 is preferably secured on top of the housing 6 concentrically around the bore 52 to receive one end of a pressure tube 60. The tube 60 may extend down into the bore 52 and communicates with the interior of the bellows 38 through the bore 52 and apertures 54 and 56, respectively. The opposite end of the pressure tube 60 is suitably secured in the top of the transition piece 20 downstream of the meter 4 as shown in Figure 1. It will thus be apparent that the outlet pressure of the meter 4 is constantly transmitted to the interior of the bellows 38 to constantly urge the spacer 32 downwardly toward the shoulders 28 and 30.

A shaft 62 (Figure 2) extends transversely through the central portion of the meter 4 to support an impeller 64 in the housing 6. The impeller or turbine 64 comprises a hub portion 66 rigidly mounted on the shaft 62 and a plurality of circumferentially spaced blades 68 extending radially outward from the hub 66. Each blade 68 is of a width substantially corresponding to the width of the housing 6 to provide a limited clearance between the sides of each blade 68 and the inner surface of the cover plates 8 and 10. Also, each blade 68 is of a length to extend into close proximity with the lower inner periphery 24 of the housing 6, as well as the lower surface of the spacer 32 when the spacer is in its lowermost position. Therefore, the impeller 64 may be rotated in the meter 4, yet limited amounts of gas can escape around the sides and the ends of the blades 68 when the spacer 32 is in its lowermost position, as illustrated in Figure 3.

The shaft 62 (see Figure 2) has a shoulder 70 formed thereon adjacent the cover plate 8 to engage a complementary shoulder 72 in the impeller hub 66, whereby the impeller 64 may be urged to the right (as viewed in Figure 2) by moving the shaft 62 to the right, as will be more fully hereinafter set forth. The shaft 62 extends through complementary apertures 74 in the central portions of the cover plates 8 and 10 and then on outwardly through external bosses 76 which are formed on the central portion of each cover plate. Suitable bracing webs 77 extend radially outward from each boss 76 to the outer periphery of the respective cover plate. Each of the bosses 76 has two counter-bores 78 and 80 formed concentrically with the respective aperture 74. A bearing member 82 is disposed in each of the innermost counter-bores 80 to journal the shaft 62 in the cover plates 8 and 10.

The outermost counter-bore 78 of the cover plate 8 has a retaining member or cap 84 secured therein by a plurality of circumferentially spaced bolts 86. The cap 84 has a sealing ring 88 on the outer periphery thereof to provide a seal between the cap 84 and the respective counter-bore 78. Also, the cap 84 has a suitable grease fitting 90 secured in the central portion thereof. The grease fitting 90 communicates with a passageway 92 formed through the central portion of the cap 84 and a counter-bore 94 formed on the inner end of the cap 84 concentrically around the passageway 92. The grease fitting 90 may be utilized to supply a lubricant through the passageway 92 and counter-bore 94 to the bearing 82, as well as the respective end of the shaft 62. A lubricating passageway 96 extends through the center of the shaft 62 from the end thereof adjacent the counter-bore 94 to a point adjacent the aperture 74 of the opposite cover plate 10, and then outwardly into communication with the aperture 74. Thus, the lubricant supplied by the fitting 90 will be urged through the shaft 62 to lubricate the opposite bearing 82. A suitable counter-bore 98 may be formed between the aperture 74 and the counter-bore 80 of the cover plate 10 to provide a passageway for the lubricant to the right-hand bearing 82.

The shaft 62 is reduced in diameter substantially conterminous with the outer end of the right-hand bearing 82 and is threaded immediately outward of said bearing. A retaining nut 100 is threaded on the shaft 62 adjacent the shoulder 99 to retain the shaft 62 in the desired longitudinal position. It will be apparent that when the nut 100 is tightened on the shaft 62, the shoulder 70 will engage the shoulder 72 of the impeller hub 66 and the nut 100 will contact the outer face of the right-hand bearing unit 82 to retain the shaft assembly in the desired position.

A cap 102 extends into the outermost counter-bore 78 of the cover plate 10 into contact with the outer end of the retaining nut 100. The inner end of the cap 102 may be sealed to the outer face of the nut 100 by a suitable sealing ring 104. Also, a sealing ring 106 is preferably provided in the outer periphery of the cap 102 to provide a seal with the walls of the respective counter-bore 78. The cap 102 is secured to the respective boss 76 by a plurality of circumferentially spaced bolts 108. The shaft 62 extends loosely through an aperture 110 formed through the central portion of the cap 102, and the outer end 112 thereof is connected to a suitable counter mechanism 114, as shown schematically in Figure 1. The counter 114 may be supported in any desired manner, such as by an arm 119 extending upwardly from the cover plate 10.

An annular groove 116 is formed in the inner face of each of the cover plates 8 and 10 concentrically around and spaced from the respective aperture 74. Each groove 116 contains a substantially V-shaped sealing ring 118 to provide a seal around the shaft 62 at each end of the impeller hub 66 and prevent an escape of gas and condensate through the apertures 74. The webs of each sealing ring 118 are positioned outwardly, whereby gas entering the respective groove 116 will expand the sealing ring 118 and provide an effective seal between the inner face of the respective cover plate and the respective end of the impeller hub 66 to protect the bearings 82.

*Operation*

As previously stated, the meter 4 is interposed in a gas flow line by means of the connectors 22 in such a position that the gas flow will be from the inlet 16 toward the outlet 18. It will thus be seen that the impeller hub 66, spacer 32, and side plates 8 and 10 form a passageway for gas flowing through the meter; and that the gas flows through approximately 180° in passing through the meter 4, with three of the impeller blades 68 covered between the inlet 16 and outlet 18. As the gas is discharged through the inlet 16 over the ramp 19, it contacts the impeller blade 68 immediately above the inlet 16 to provide a counter-clockwise rotative force to the impeller 64. It will be apparent that as each blade 68 is moved to a position above the inlet 16, the inlet gas will impinge on the blade to force the impeller 64 counter-clockwise. The ramp 19 increases the starting impingement at low rates of gas flow. It is also to be noted that the incoming gas is exposed to the lower face of the spacer 32, whereby the pressure of the gas tends to urge the spacer 32 upwardly. However, the downstream gas pressure is exerted through the pressure line 60 into the bellows 38 to provide a downward force on the spacer 32. When these two forces are balanced, the spacer 32 will be retained in a fixed vertical position.

As is well known, the force exerted upon an impeller by a stream of gas is proportional to the square of the velocity of the stream. This relationship causes disproportionate readings in a meter having a fixed clearance around the impellers. These disproportionate readings are minimized by the function of the movable spacer 32. Upon an increase in the pressure of the incoming gas, the spacer 32 will be urged upwardly to provide an enlarged clearance around the upper ends of the impeller blades 68, whereby a portion of the gas passing through the meter 4 will pass above the blades 68 and not be effective in rotating the impeller 64. The spacer 32 will move upwardly until the force exerted by the downstream pressure through the pressure line 60, and the natural force of the bellows 38, equals the force exerted by the incoming gas stream. It will be noted, however, that when the meter 4 is first placed in operation, the spacer 32 will be in its lowermost position on the shoulders 28 and 30 to provide a maximum impingement of the incoming gas on the impeller blades 68. Thus obtaining the maximum force from the initial portion of the gas stream to provide rotation of the impeller 64.

It will be apparent that the rotation of the impeller 64 for a given volume of gas will be partially controlled by the pressure drop through the meter 4 from the inlet 16 to the outlet 18. The vertical adjustment of the spacer 32 provides a substantially constant pressure drop of the gas passing through the meter 4 during varying flow rates. When the inlet pressure is increased, the spacer 32 moves upwardly to provide a larger passageway through the meter 4. This upward motion is caused by the fact that the effective area of application of force upon the spacer from within the concave side of the spacer 32 is greater than the effective area of application of force upon the spacer from within the bellows. This difference in area being constant, it results that the greater the incoming pressure, the greater the upward force upon the spacer. Therefore, upon increase of the incoming pressure, the spacer will be moved upwardly, and the space passageway around the tips of the impeller blades will be increased. The upward motion of the spacer will be checked by the downward force thereon exerted by the bellows. As another result of this constant adjustment of the position of the spacer, the pressure drop through the meter is maintained substantially constant.

The rotation of the impeller 64 will also depend upon the mass and the velocity of the gas flowing through the meter 4, inasmuch as the incoming gas impinges upon the impeller blades 68 as they pass upwardly beyond the inlet 16. However, when the spacer 32 is raised from the impeller 64, a portion of the incoming gas is by-passed around the impeller 64, thereby decreasing the skin friction compared to what it would have been had the spacer not been raised. The by-passing of gas, together with the control of pressure drop and skin friction, result in a rotation of the impeller in a more linear fashion with respect to the rate of gas flow, and the impeller rotation will then be directly indicative of the volume of gas flowing through the meter.

It will be apparent to those skilled in the art that the counter 114 may be calibrated to read directly in cubic feet of gas instead of the usual revolutions. Also, the gear ratios of the counter 114 may be adjusted for a specific temperature, gravity of gas and line pressure of gas flowing through the meter 4. Once the meter 4 has been calibrated, the counter 114 may be easily adjusted to measure a gas stream of a substantially constant temperature, gravity, and pressure.

An important feature of this invention is the limited expansion of the gas stream as it passes through the meter 4. In one embodiment of this invention, the inlet and outlet passageways 16 and 18 were constructed 2" x 2" and the impeller blades were constructed approximately 2" x 2½". Also, the travel of the spacer 32 was set at approximately ½ of an inch. It will then be apparent that when the gas is discharged from the inlet 16 into the housing 6, the gas will not be substantially expanded. Therefore, hydrates in the gas will not tend to precipitate on the impeller 64.

From the foregoing, it will be apparent that the present invention provides a novel gas measuring device which may be read directly to obtain the quantity of gas passing therethrough, and the use of charts may be eliminated. The present meter is particularly adapted for measuring an intermittently flowing gas stream, since the meter may be constructed to accurately measure during large volume changes. The pressure drop of gas flowing through the meter is controlled to provide an accurate calibration and operation of the meter. It will also be apparent that the present meter is simple in construction and may be economically manufactured.

Changes may be made in the combination and arrangement of parts as heretofore set forth in the specification and shown in the drawings, it being understood that modifications may be made in the precise embodiment shown without departing from the spirit of the appended claims.

The invention having been described, what is claimed and desired to be obtained by Letters Patent is:

1. In a gas meter for interposition in a gas flow conduit, a hollow housing having an inlet and an outlet for connection with the flow conduit, an impeller rotatably supported in said housing in a direction transverse to the flow path of gas between said inlet and said outlet, said impeller having radially outwardly extending blades thereon arranged to be sequentially contacted by gas flowing through said housing for rotation of said impeller in accordance with the flow rate of the gas, a spacer in said housing extending from said inlet to said outlet and forming a restriction in the flow of gas around said impeller, means connected to said housing for moving said spacer toward and away from said impeller in accordance with the flow rate of gas through said housing to control the pressure drop of the gas through said housing, and a pressure conduit connecting said means with the flow conduit.

2. A gas meter as defined in claim 1 characterized further in that said inlet is arranged to impinge the gas substantially tangentially on the impeller blades.

3. In a gas meter for use in a gas flow conduit, a housing having a gas passageway therethrough, an impeller rotatably supported in said housing and extending into said passageway for rotation in accordance with the flow of gas through said passageway, an arcuately-shaped spacer yieldingly supported in said chamber above said impeller and extending substantially from the inlet to the outlet of said housing, a bellows securing said spacer to said housing, and a conduit for connecting said bellows with the flow conduit.

4. In a gas meter for use in a gas flow conduit, a housing having a gas flow passageway therethrough, said passageway having a gas inlet and a gas outlet for connection with the flow conduit, an impeller rotatably supported in said housing and extending into said passageway for rotation by gas flowing through said passageway, a movable spacer in said housing forming one wall of said passageway for varying the cross-sectional area of said passageway, a bellows secured between said housing and said spacer for moving said spacer toward and away from said impeller in accordance with the flow rate of gas through said housing, and a pressure conduit connecting said bellows with the flow conduit.

5. A gas meter for interposition in a gas flow conduit, comprising a housing having a circular-shaped chamber therein, an inlet conduit extending downwardly and outwardly from one side of said housing in communication with said chamber for connection with the flow conduit, an outlet conduit extending downwardly and outwardly from the opposite side of said housing in communication with said chamber for connection with the flow conduit, an impeller having radially outwardly extending blades rotatably secured in said chamber, said impeller being arranged to extend along an axis transverse to said inlet and outlet conduits and arranged to position the outer ends of the blades extending downwardly therefrom in proximity with the lower periphery of said chamber between said conduits, an arcuately-shaped spacer yieldingly supported in said chamber above said impeller and extending from said inlet conduit to said outlet conduit, the lower radius of said spacer being in conformity with the outer radius of said impeller, a bellows securing said spacer to said housing and yieldingly supporting said spacer, and a pressure conduit connecting said bellows with the flow conduit.

6. A gas meter as defined in claim 5 characterized further in having a counter connected to said impeller.

References Cited in the file of this patent

UNITED STATES PATENTS

| | | |
|---|---|---|
| 1,647,705 | Loftus | Nov. 1, 1927 |
| 1,779,260 | Mobley | Oct. 21, 1930 |

FOREIGN PATENTS

| | | |
|---|---|---|
| 930,783 | Germany | July 25, 1955 |